(12) United States Patent
Maeda et al.

(10) Patent No.: US 8,004,958 B2
(45) Date of Patent: Aug. 23, 2011

(54) INFORMATION RECORDING/REPRODUCING APPARATUS

(75) Inventors: Takanori Maeda, Saitama (JP); Kiyoshi Tateishi, Saitama (JP)

(73) Assignee: Pioneer Corporation, Tokyo (JP)

( * ) Notice: Subject to any disclaimer, the term of this patent is extended or adjusted under 35 U.S.C. 154(b) by 153 days.

(21) Appl. No.: 12/297,421

(22) PCT Filed: Apr. 18, 2007

(86) PCT No.: PCT/JP2007/058445
§ 371 (c)(1),
(2), (4) Date: Dec. 5, 2008

(87) PCT Pub. No.: WO2007/123155
PCT Pub. Date: Nov. 1, 2007

(65) Prior Publication Data
US 2009/0097385 A1   Apr. 16, 2009

(30) Foreign Application Priority Data
Apr. 18, 2006   (JP) .................................. 2006-114221

(51) Int. Cl.
*G11B 9/02* (2006.01)
(52) U.S. Cl. ........................................ 369/126; 977/947
(58) Field of Classification Search .................. None
See application file for complete search history.

(56) References Cited

U.S. PATENT DOCUMENTS

| 5,053,995 A * | 10/1991 | Kajimura et al. ............. 369/126 |
| 5,075,548 A * | 12/1991 | Kajimura ........................... 850/1 |
| 5,349,735 A * | 9/1994 | Kawase et al. ............. 29/407.05 |
| 5,371,728 A * | 12/1994 | Sakai et al. ..................... 369/126 |
| 7,212,484 B2 | 5/2007 | Maeda et al. |
| 7,502,304 B2 | 3/2009 | Maeda et al. |
| 7,672,214 B2 | 3/2010 | Ono et al. |
| 7,738,351 B2 | 6/2010 | Maeda |
| 2002/0060978 A1 | 5/2002 | Hirotsune et al. |
| 2005/0099895 A1 | 5/2005 | Maeda et al. |
| 2006/0182004 A1 | 8/2006 | Maeda et al. |
| 2006/0245312 A1 | 11/2006 | Maeda et al. |
| 2007/0291605 A1 | 12/2007 | Maeda |
| 2009/0001998 A1 | 1/2009 | Tateishi et al. |
| 2009/0178168 A1 | 7/2009 | Maeda et al. |
| 2009/0252024 A1 | 10/2009 | Maeda |
| 2010/0014412 A1 | 1/2010 | Maeda et al. |
| 2010/0033159 A1 | 2/2010 | Tateishi et al. |
| 2010/0110849 A1 | 5/2010 | Maeda et al. |
| 2010/0231234 A1 | 9/2010 | Tateishi et al. |

FOREIGN PATENT DOCUMENTS

| JP | 3-49087 | 3/1991 |
| JP | 2002-117591 | 4/2002 |

OTHER PUBLICATIONS

International Search Report for PCT/JP2007/058445, mailed Jul. 10, 2007.

\* cited by examiner

*Primary Examiner* — Peter Vincent Agustin
(74) *Attorney, Agent, or Firm* — Nixon & Vanderhye P.C.

(57) ABSTRACT

A probe group is composed of, for instance, four probes adjacently arranged, and one modulation circuit is arranged for each probe group. At the time of recoding information, a changeover switch connects one of the four probes with the modulation circuit, and subsequently changes the probes to be connected with the modulation circuit while reciprocal movement of a recording medium is being controlled.

6 Claims, 12 Drawing Sheets

[FIG. 1]
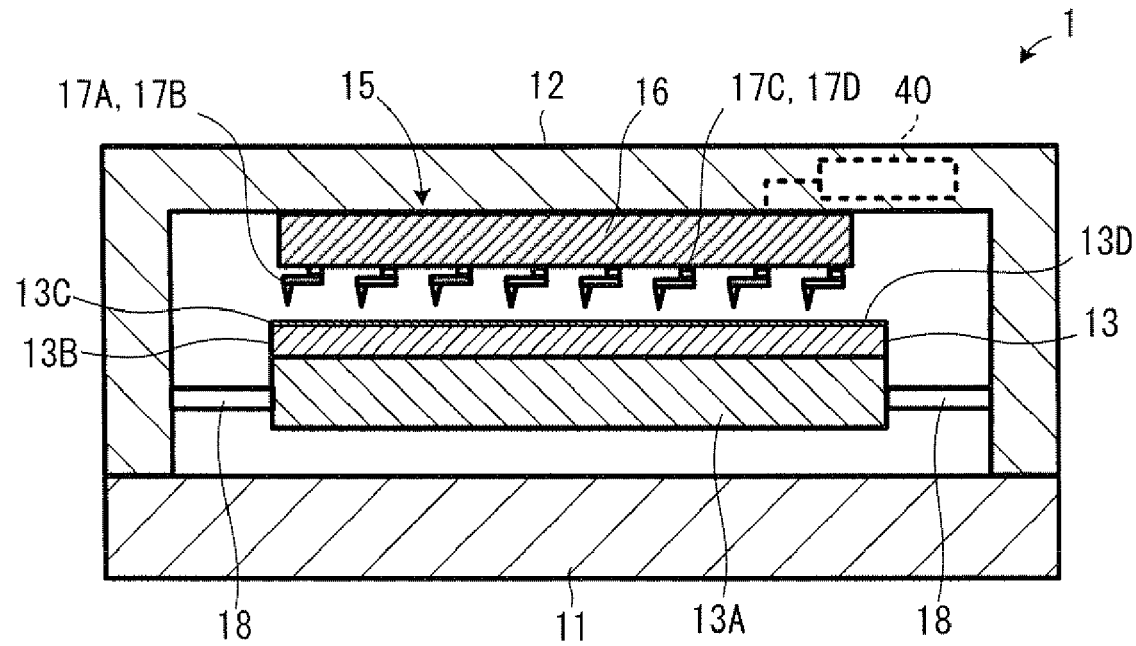

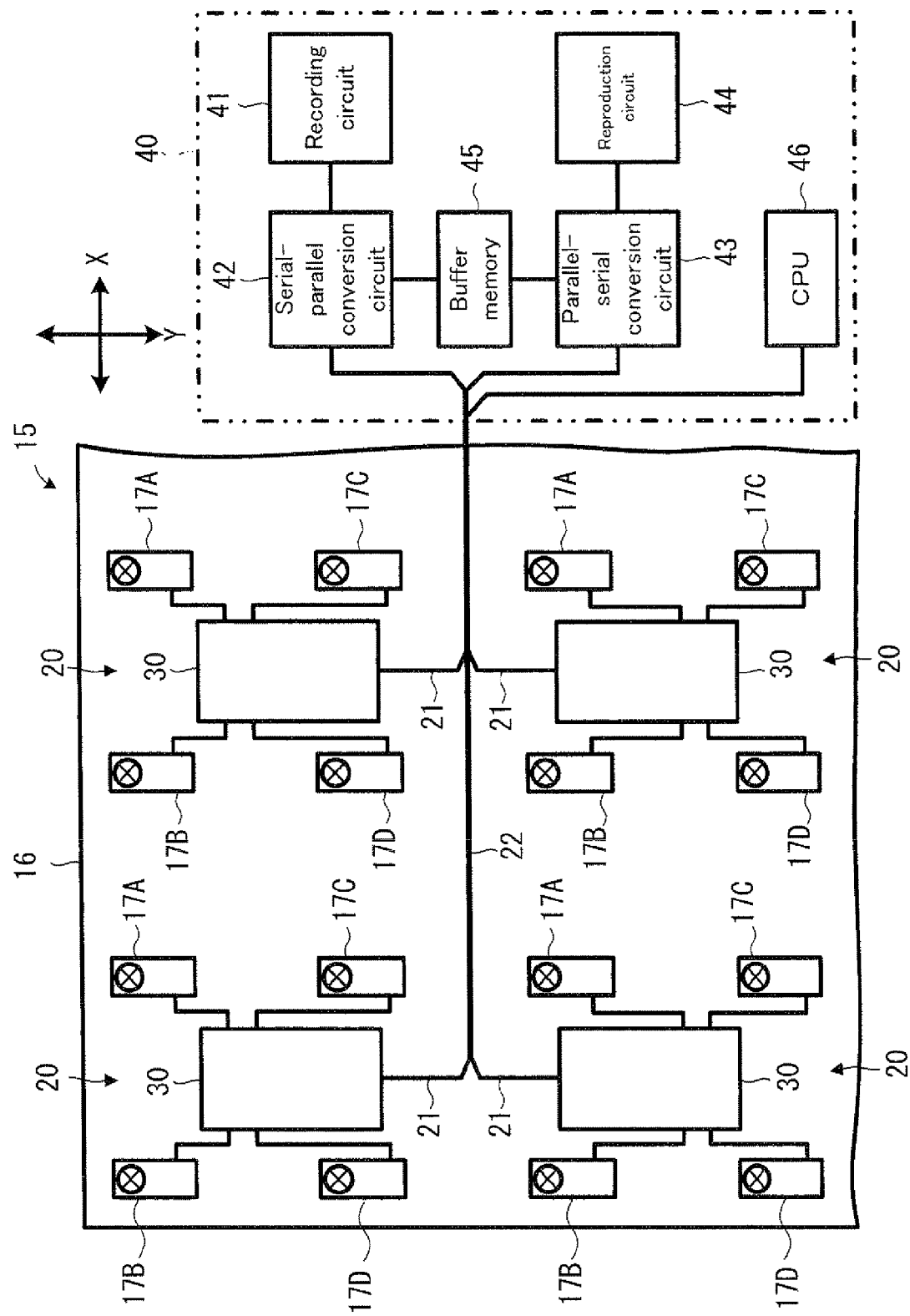
[FIG. 2]

[FIG. 3]
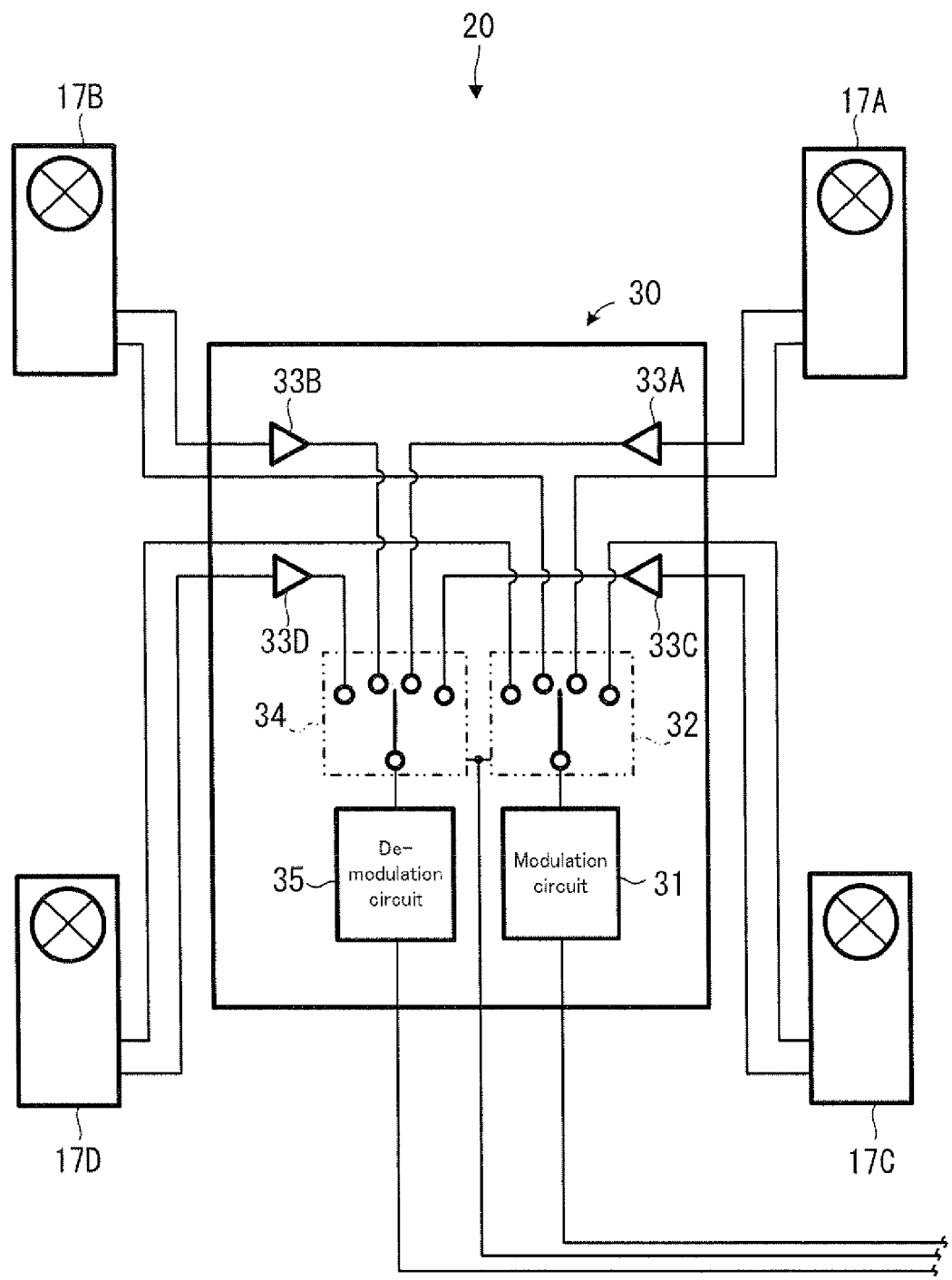

[FIG. 4]
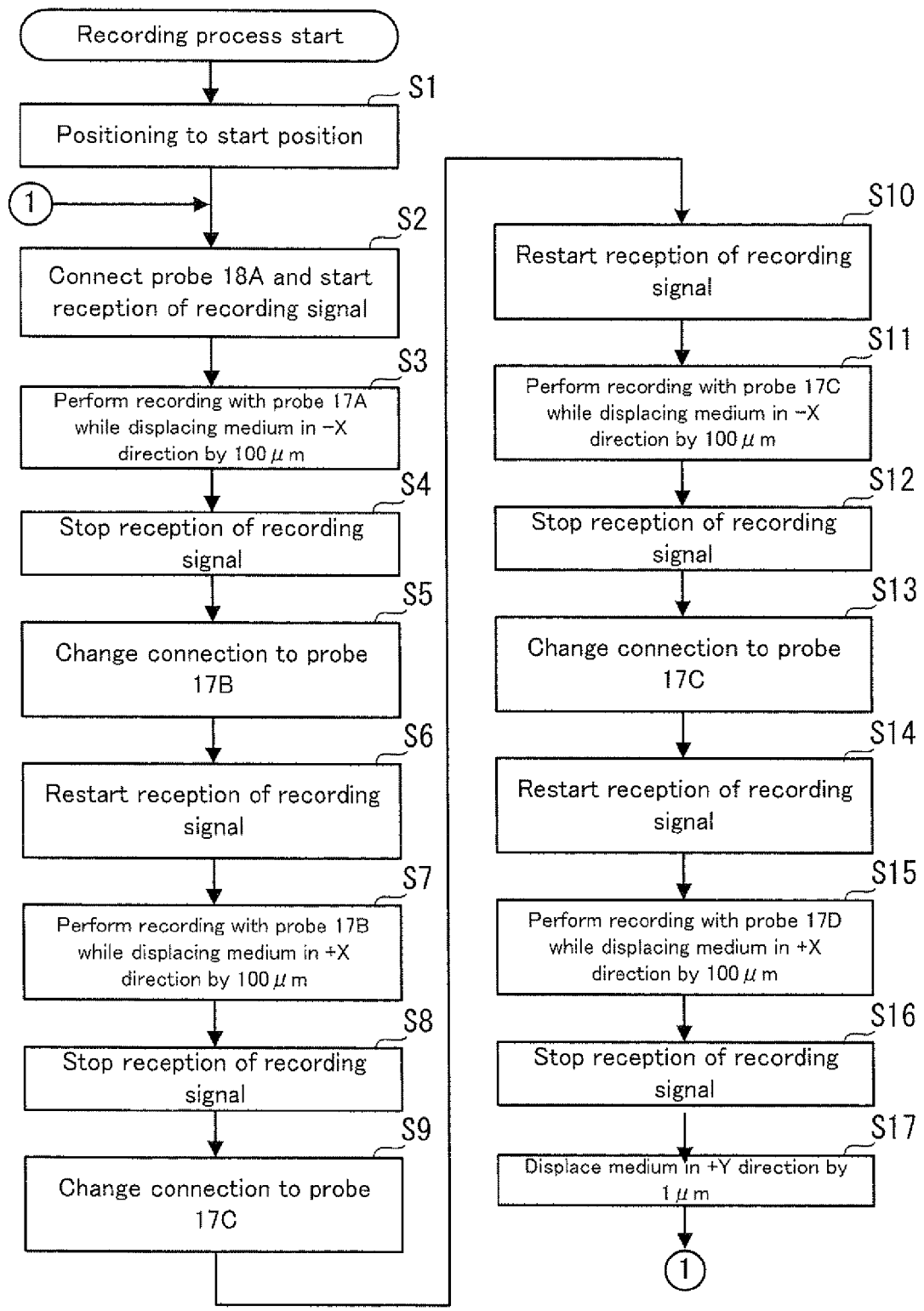

[FIG. 5]
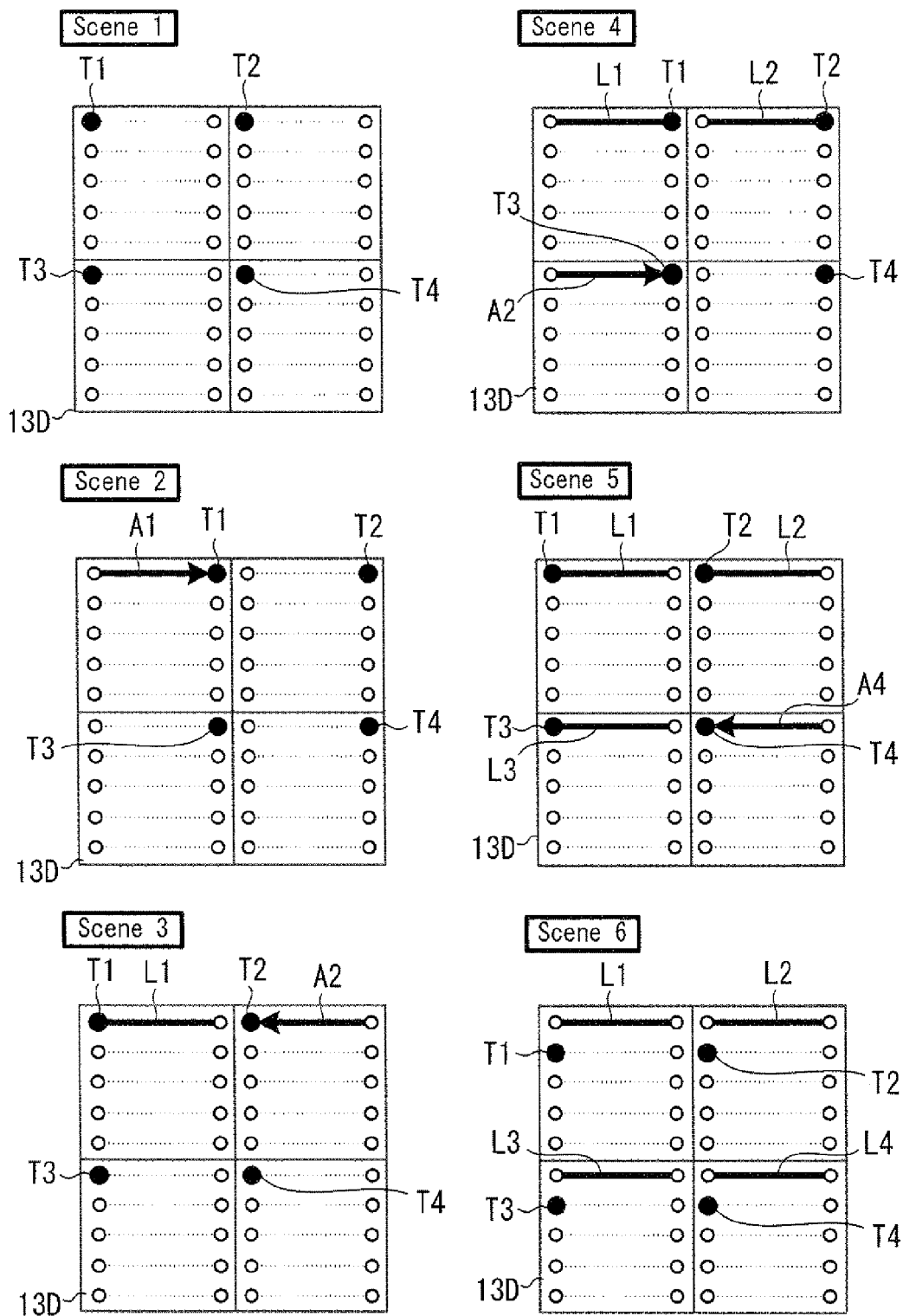

[FIG. 6]
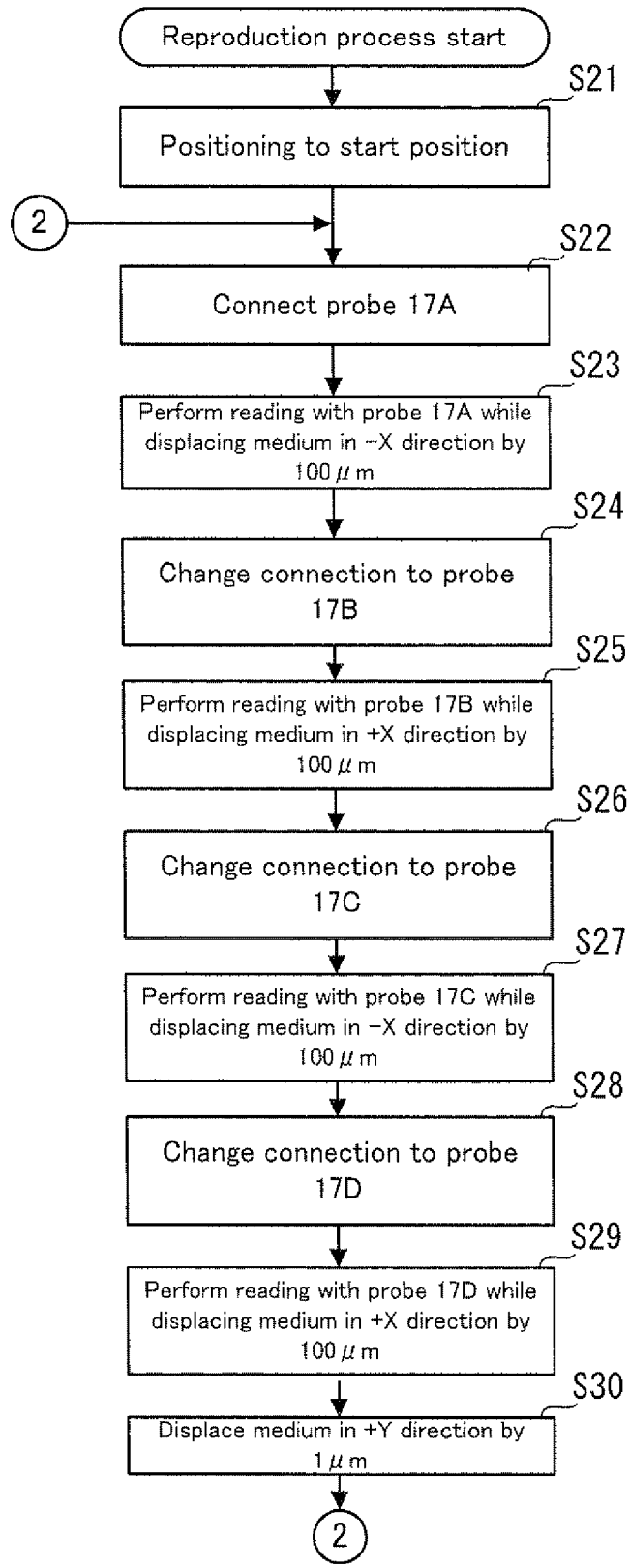

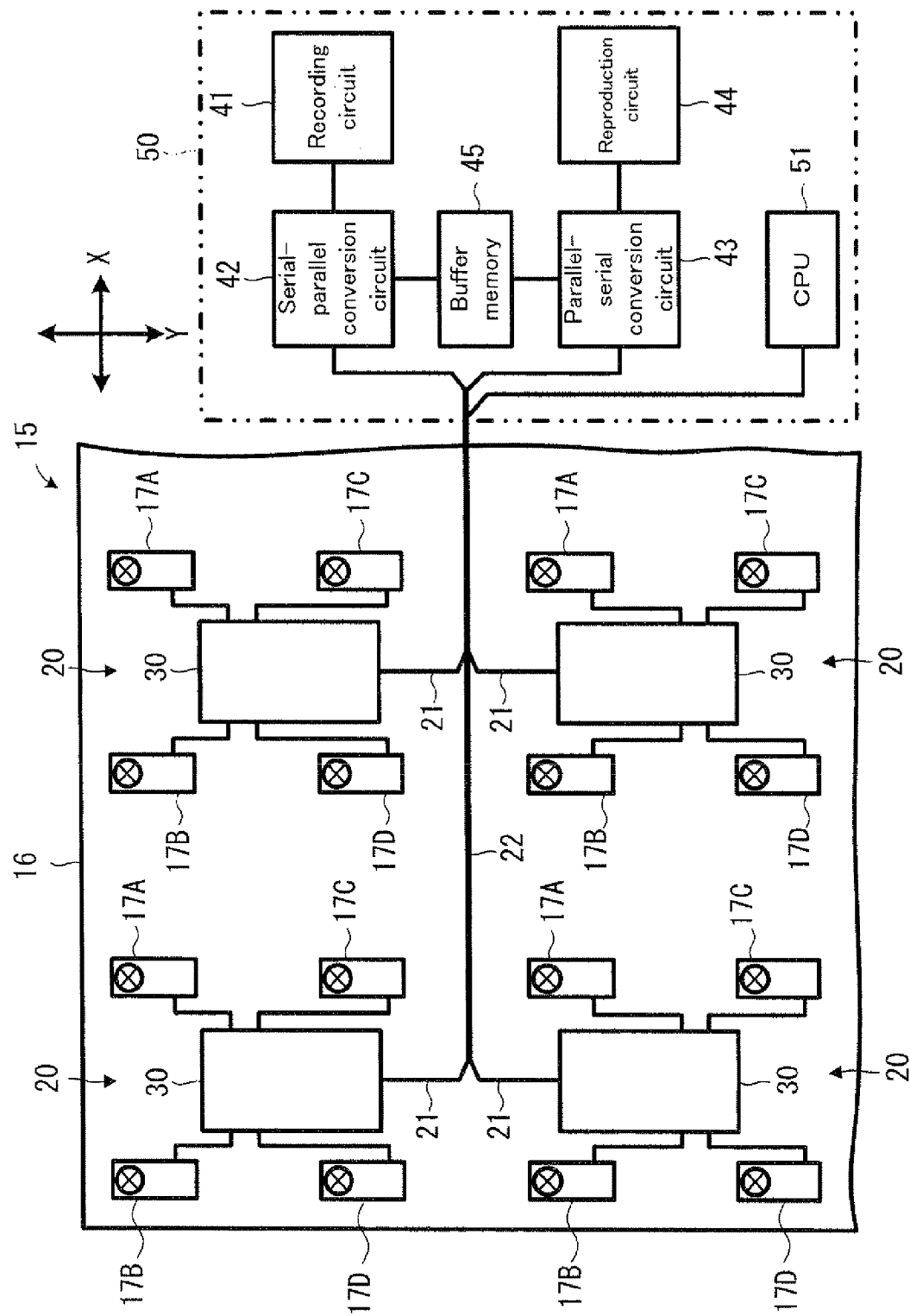
[FIG. 7]

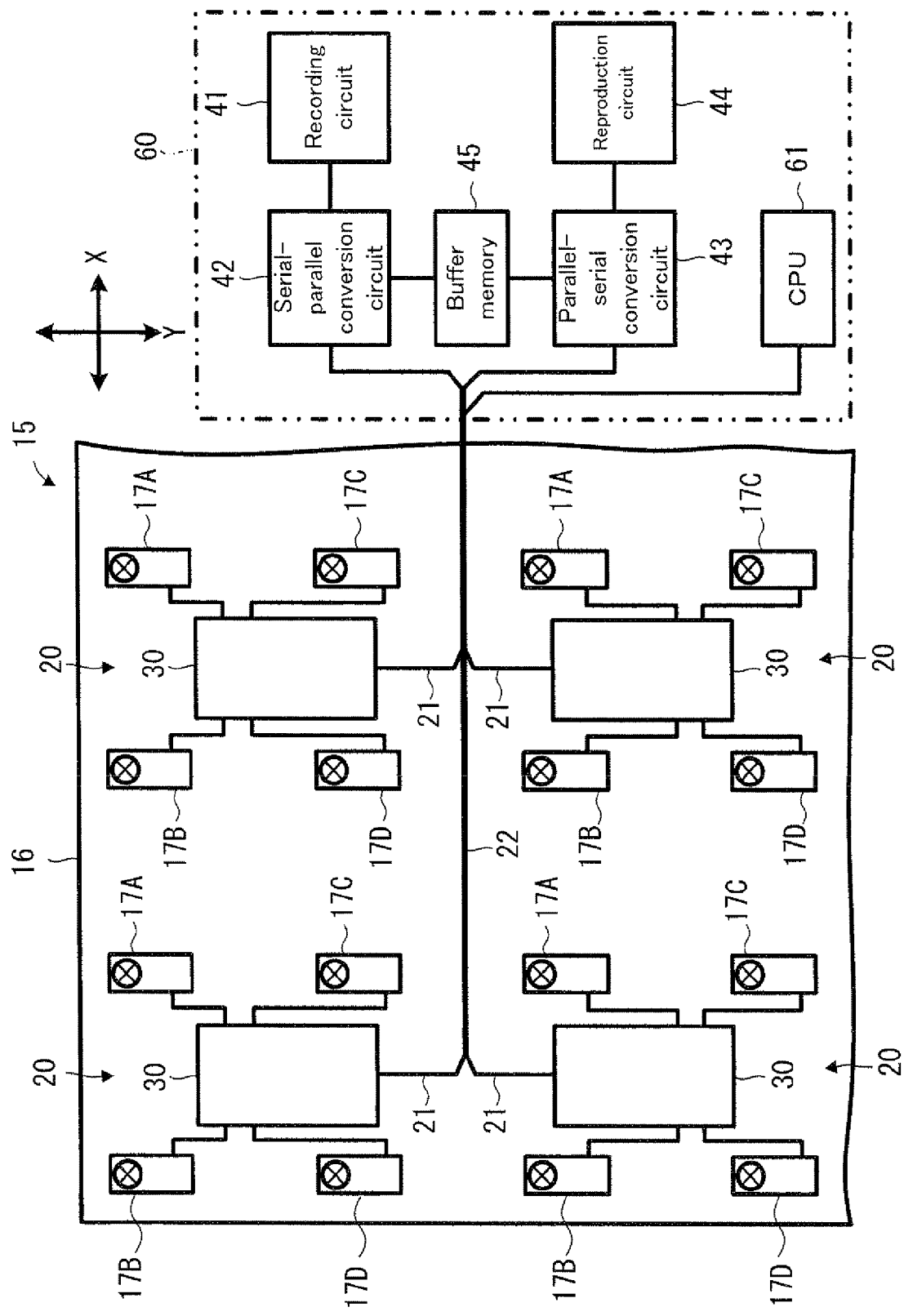
[FIG. 8]

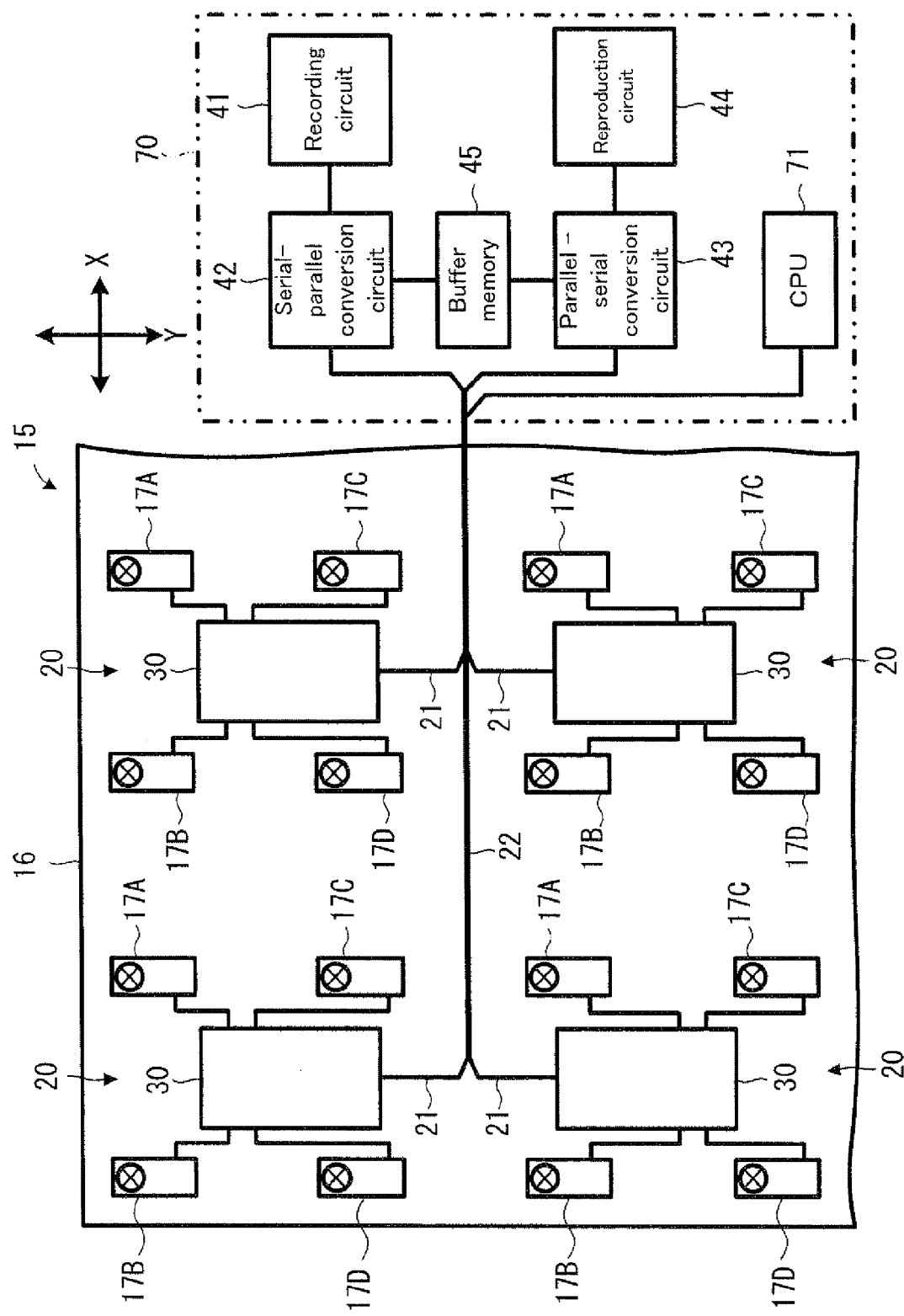
[FIG. 9]

[FIG. 10]
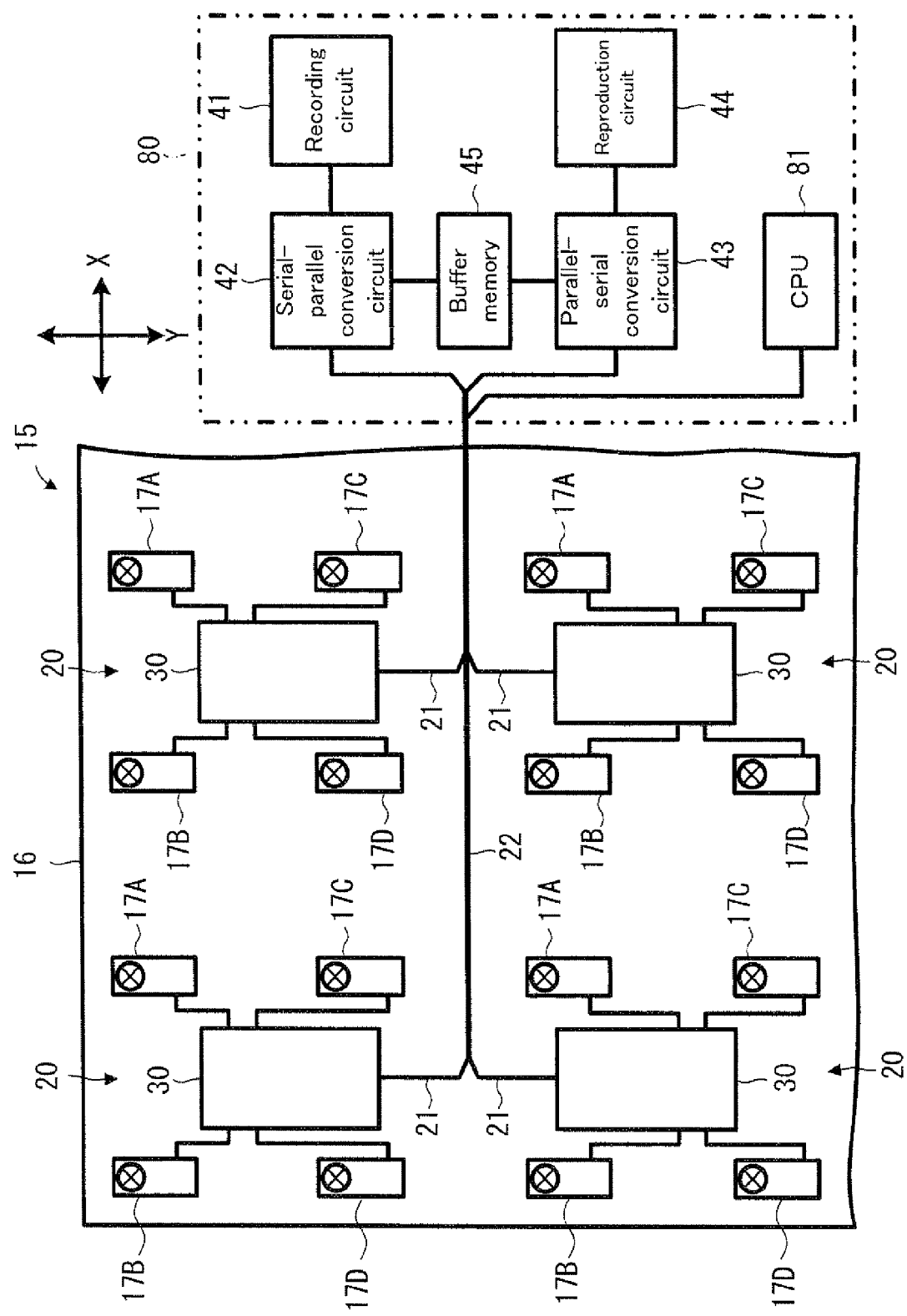

[FIG. 11]
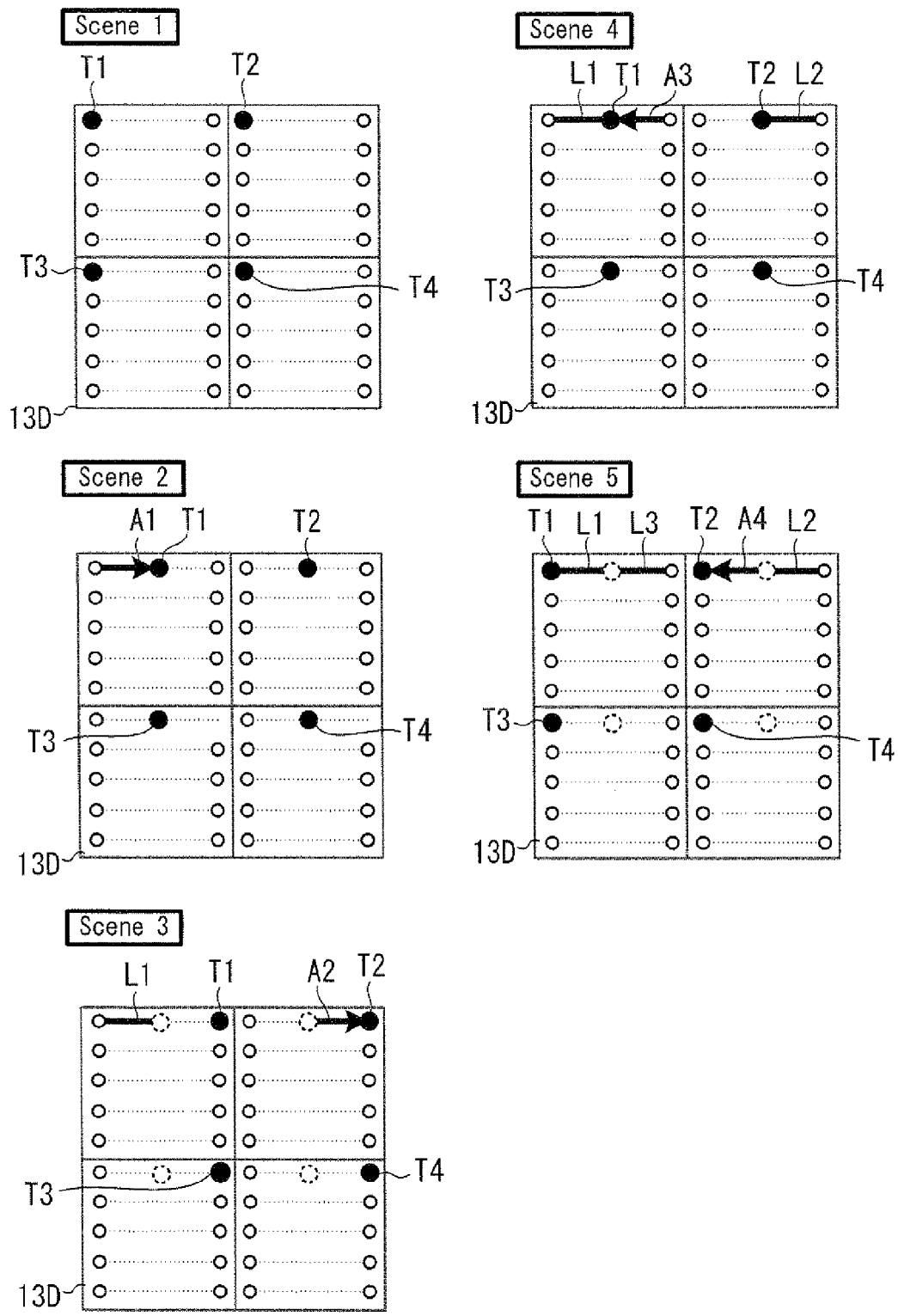

[FIG. 12]
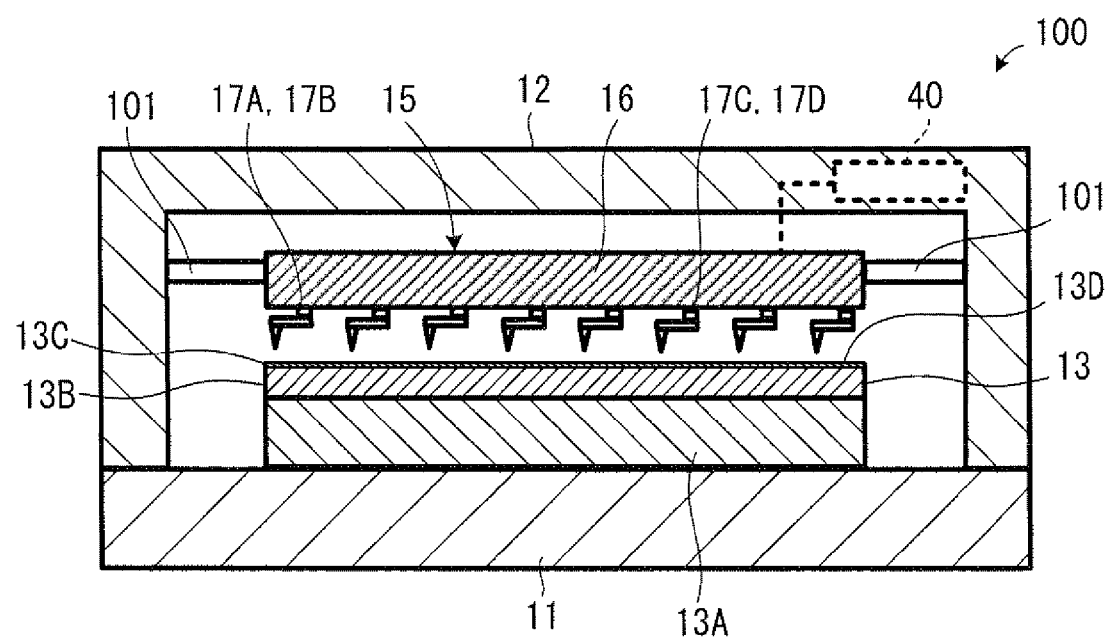

INFORMATION RECORDING/REPRODUCING APPARATUS

This application is the U.S. national phase of International Application No. PCT/JP2007/058445, filed 18 Apr. 2007, which designated the U.S. and claims priority to JP Application No. 2006-114221, filed 18 Apr. 2006, the entire contents of each of which are hereby incorporated by reference.

TECHNICAL FIELD

The present invention relates to an information recording/reproducing apparatus for recording or reproducing information with respect to an information recording medium, using a plurality of probes, such as a scanning probe memory apparatus, for example.

BACKGROUND ART

As a small-sized information memory apparatus which can record information highly densely, a scanning probe memory apparatus is listed.

The scanning probe memory apparatus has various types: using a tunnel effect, using an atomic force, using a magnetic force, using an electrostatic force, using a non-linear dielectric constant, and using heat deformation of a recording medium.

The scanning probe memory apparatus is normally provided with: a probe having a tip with a radius of about several tens nanometers to several micrometers; and a plate-like (or flat) recording medium having a recording surface formed on its surface. The scanning probe memory apparatus brings the tip of the probe closer to or into contact with the recording surface of the recording medium, to thereby perform information recording or reading on the recording medium.

Moreover, the scanning probe memory apparatus displaces the probe or the recording medium in a parallel direction to the recording surface, to thereby change the positional relation between the probe and the recording medium. By this, it is possible to scan the recording surface of the recording medium, using the probe, so that a large amount of information can be arranged on the recording surface, highly densely. Alternatively, the large amount of information arranged on the recording surface can be read, continuously or randomly. For such displacement of the probe or the recording medium, an electromagnetically-driven or electrostatically-driven actuator using e.g. a MEMS (Micro Electro Mechanical System) technology is used.

Moreover, most scanning probe memory apparatuses adopt a multi-probe method. That is, most scanning probe memory apparatuses are provided with: a two-dimensional probe head in which several tens, or several hundreds, or several thousands of probes are arranged in a matrix, for example. By using such a probe head, it is possible to quickly record the large amount of information into the recording medium, or it is possible to quickly read the large amount of information from the recording medium.

DISCLOSURE OF INVENTION

Subject to be Solved by the Invention

By the way, in order to improve the performance of the probe memory apparatus, it is required to increase an information recording speed and an information reading speed, to limit or control power consumption by the driving of an actuator, and to reduce the size of the probe memory apparatus, and the like.

As one method responding to these requirements in a balanced manner, there is a method of reducing the stroke amount of the actuator for displacing the probe or the recording medium in the parallel direction to the recording medium.

For example, by reducing the stroke amount of the actuator, it is possible to increase the driving frequency of the actuator. By this, it is possible to displace the probe or the recording medium at high speed in the parallel direction to the recording medium.

Moreover, by reducing the stroke amount of the actuator, the minimum resonance frequency of the actuator is set to be high. Then, the actuator is driven at a frequency near the minimum resonance frequency. By this, it is possible to reduce the power consumption by the driving of the actuator.

Moreover, by reducing the stroke amount of the actuator, it is possible to reduce the travel distance of the probe head or the recording medium which is displaced in the parallel direction to the recording surface. By this, it is possible to reduce the length or width of the probe memory apparatus in the parallel direction to the recording surface.

However, the reduction in the stroke amount of the actuator causes the following problems.

That is, if the stroke amount of the actuator is reduced on the premise that there is no change in an information recording capacity, in an information recording density, and in an area size of a recording area of the recording medium, then the number of probes is increased and an interval of probes is reduced.

For example, it is assumed that in the probe memory apparatus before the design change, the recording area of the recording medium is a square 2 mm on a side, the stroke amount of the actuator is 200 μm, the number of the probes is 10×10 (=100), and the interval of the adjacent probes is 200 μm.

Then, it is assumed that the design of the probe memory apparatus is changed and the stroke amount of the actuator is changed to 100 μm. Then, the number of the probes is 20×10 (=200), and the interval of the adjacent probe is 100 μm.

On the premise that the information recorded on the recording medium is read simultaneously through each probe, it is necessary to provide each probe with a demodulation circuit for demodulating a reading signal, or the like. Moreover, it is desired to dispose the demodulation circuit near each probe in view of shortening of a wiring pattern or a reduction in noise. As a result, if the number of probes is 200, 200 demodulation circuits are desirably disposed on the probe head.

The reduction in the interval of the adjacent probes causes such a problem that it is hard to ensure a space to dispose the demodulation circuits on the probe head.

On the other hand, on the premise that the information recorded on the recording medium is read simultaneously through each probe, it is desired to convert a plurality of reading signals, which are supplied from the plurality of probes in parallel, to one reading signal by parallel-serial conversion and to send the one reading signal to a reproduction circuit or the like disposed in the downstream of the probe head.

However, if the number of the probes is increased, then the number of the reading signals, which are supplied from the plurality of probes in the information reading, is also increased. Thus, there is such a problem that a buffer memory with a large memory capacity is required in order to perform the parallel-serial conversion on the reading signals.

In view or the aforementioned problems, it is therefore an object of the present invention to provide an information recording/reproducing apparatus, which can reduce the stroke amount of the actuator for displacing the probe head or the recording medium in the parallel direction to the recording surface.

It is a second object of the present invention to provide an information recording/reproducing apparatus, which can reduce the number of the reading signals, supplied from the respective probes in parallel in the information reading, as compared with the number of the probes provided for the probe head.

Means for Solving the Subject

The above object of the present invention can be achieved by an information recording/reproducing apparatus provided with: a recording medium having a recording surface; a probe head in which one or a plurality of probe groups are arranged, the probe group including a plurality of probes which are close to each other and which record or read information with respect to the recording surface of the recording medium; an actuator which performs displacement control of the recording medium or the probe head in order to reciprocate the recording medium or the probe head in a parallel direction to the recording surface; a signal processing circuit which is provided for each probe group and which supplies the each probe with a recording signal corresponding to the information to be recorded onto the recording surface of the recording medium, or which receives a reading signal corresponding to the information read from the each probe; and a changing device which connects one of a plurality of probes included in the each probe group with the signal processing circuit corresponding to the probe group and which changes a probe to be connected to the signal processing circuit during the displacement control of the recording medium or the probe head.

These effects and other advantages of the present invention will become more apparent from the embodiments explained below.

BRIEF DESCRIPTION OF DRAWINGS

FIG. 1 is a cross sectional view showing a scanning probe memory apparatus in a first embodiment of the information recording/reproducing apparatus of the present invention.

FIG. 2 is a block diagram showing a probe head and a post-circuit unit of the scanning probe memory apparatus in FIG. 1.

FIG. 3 is a circuit diagram showing a probe group in FIG. 2.

FIG. 4 is a flowchart showing the operation in an information recording process of the scanning probe memory apparatus in FIG. 1.

FIG. 5 is an explanatory diagram showing the operation in the information recording process of the scanning probe memory apparatus in FIG. 1.

FIG. 6 is a flowchart showing the operation in an information reproducing process of the scanning probe memory apparatus in FIG. 1.

FIG. 7 is a block diagram showing a probe head and a post-circuit unit of a scanning probe memory apparatus in a second embodiment of the information recording/reproducing apparatus of the present invention.

FIG. 8 is a block diagram showing a probe head and a post-circuit unit of a scanning probe memory apparatus in a third embodiment of the information recording/reproducing apparatus of the present invention.

FIG. 9 is a block diagram showing a probe head and a post-circuit unit of a scanning probe memory apparatus in a fourth embodiment of the information recording/reproducing apparatus of the present invention.

FIG. 10 is a block diagram showing a probe head and a post-circuit unit of a scanning probe memory apparatus in a fifth embodiment of the information recording/reproducing apparatus of the present invention.

FIG. 11 is an explanatory diagram showing the operation in the information recording process of the scanning probe memory apparatus in the fifth embodiment of the present invention.

FIG. 12 is a cross sectional view showing a scanning probe memory apparatus in an another embodiment of the information recording/reproducing apparatus of the present invention.

| Description of Reference Codes | |
|---|---|
| 1, 100 | scanning probe memory apparatus |
| 13 | recording medium |
| 13D | recording surface |
| 15 | probe head |
| 17A to 17D | probe |
| 18, 101 | actuator |
| 20 | probe group |
| 31 | modulation circuit |
| 32, 34 | selector switch |
| 35 | demodulation circuit |
| 46, 51, 61, 71, 81 | CPU |

BEST MODE FOR CARRYING OUT THE INVENTION

Hereinafter, the best mode for carrying out the invention will be explained in each embodiment in order, with reference to the drawings.

First Embodiment

Firstly, an explanation will be given on the basic function of a scanning probe memory apparatus in a first embodiment of the present invention.

FIG. 1 is a cross sectional view showing a scanning probe memory apparatus in a first embodiment of the information recording/reproducing apparatus of the present invention.

A scanning probe memory apparatus 1 in FIG. 1 is a small-sized apparatus, for example, which is several millimeters to several centimeters in length and in width (length in a horizontal direction in FIG. 1) and which is several millimeters in thickness (length in a vertical direction in FIG. 1), in external dimension.

The probe memory apparatus 1 can record information onto a recording surface 13D of a recording medium 13, highly densely, using probes 17A to 17D, and has a huge memory capacity regardless of its small size. For example, the memory capacity is several tens to several hundreds gigabytes, and can also exceed a terabyte.

The probe memory apparatus 1 records the information using the spontaneous polarization of a ferroelectric substance. That is, the tips of the probes 17A to 17D are brought closer to or into contact with the recording surface 13D of the recording medium 13, which has a recording layer 13C formed of a ferroelectric material, and a voltage exceeding a coercive electric field of the ferroelectric substance is applied through the probes 17A to 17D. By this, the polarization direction of the ferroelectric substance is changed, to thereby record the information. Moreover, the reproduction of the information recorded in the recording medium 13 is performed by a SNDM (Scanning Nonlinear Dielectric Microscopy) method.

Moreover, the probe memory apparatus 1 is provided with an actuator 18, and the driving of the actuator 18 allows the recording medium 13 to be displaced in a parallel direction to the recording surface 13D. On the other hand, the probes 17A to 17D are mounted on a probe head 15, and the probe head 15 is fixed to a housing 12. By this, it is possible to change the relative position between the probes 17A to 17D and the recording medium 13, to thereby scan the recording surface 13D by using the probes 17A to 17D.

Moreover, the probe head 15 has 20×20 (=400) probes 17A to 17D arranged. By this, it is possible to quickly record a large amount of information onto the recording surface 13D, or to quickly read a large amount of information from the recording surface 13D.

Next, the structure of the probe memory apparatus 1 will be specifically explained.

As shown in FIG. 1, the probe memory apparatus 1 has a plate-like housing 11 disposed in the lower portion and the cup-shaped housing 12 disposed in the upper portion. There is a space formed between the housing 11 and the housing 12.

In the space formed between the housing 11 and the housing 12, the recording medium 13 is disposed. There is also a vacant space or gap between the lower surface of the recording medium 13 and the upper surface of the housing 11. Moreover, there is also a vacant space or gap between the upper surface of the recording medium 13 and the lower surface of the housing 12. Moreover, each side surface of the recording medium 13 is away from each inner side surface of the housing 12 facing the side surface of the recording medium 13.

The recording medium 13 is supported by the housing 12 using a support member, which is one of the constituent elements of the actuator 18.

The recording medium 13 is provided with: a substrate 13A; an electrode 13B; and the recording layer 13C. The upper surface of the recording layer 13C is the recording surface 13D. The substrate 13A is plate-like, and is formed of $SiO_2$, for example. The electrode 13B is formed of copper, for example. The recording layer 13C is formed of a ferroelectric material, such as $LiTaO_3$ or $LiNbO_3$. Each of the recording layer 13C and the electrode 13B is desirably a thin layer with a thickness of 1 μm or less. The substrate 13A has a thickness of about 500 μm to 1 mm, for example.

The recording medium 13 has a recording area formed on the recording surface 13D, and information is recorded into the recording area. Moreover, the recording area is a square, for example, 2 mm on a side in the external shape. Moreover, the recording area is virtually divided into 20×20 (=400) recording unit areas. Each recording unit area is a square, for example, 100 μm on a side. One probe 17A, 17B, 17C, or 17D is assigned to each recording unit area of the recording medium 13.

Moreover, the probe head 15 is disposed in the space formed between the housing 11 and the housing 12. The probe head 15 is disposed above the recording medium 13.

The probe head 15 is provided with: a probe support substrate 16; and 20×20 (=400) probes 17A to 17D. Each of the probes 17A to 17D is used to perform the information recording or information reading on the recording surface 13D of the recording medium 13. The tip diameter of each of the probes 17A to 17D is about 25 nm, for example.

The 400 probes 17A to 17D are provided on the flat surface of the probe support substrate 16; namely, 20 probes are arranged at substantially even intervals along an X direction, and 20 probes are arranged at substantially even intervals along a Y direction. The X direction is a parallel direction to the recording surface 13D, and the Y direction is parallel to the recording surface 13D and crosses the X direction at almost right angles.

Moreover, an interval of the tips of the probes adjacent to each other in the X direction is 100 μm, and an interval of the tips of the probes adjacent to each other in the Y direction is also 100 μm.

Incidentally, the probes 17A to 17D in FIG. 1 are schematic, and FIG. 1 does not show the correct number of the probes 17A to 17D.

Moreover, the probe head 15 is provided with 100 primary circuit units 30 (refer to FIG. 2). The details of the primary circuit unit 30 will be detailed later.

Moreover, the actuator 18 is disposed in the space formed between the housing 11 and the housing 12. The actuator 18 performs displacement control on the recording medium 13, in order to displace the recording medium 13 in the X direction and the Y direction.

The actuator 18 is provided with: a support member and a driving device. The support member supports the recording medium 13 on the housing 12 in such a condition that the recording medium 13 can be displaced in the X direction and the Y direction. The support member is formed by processing a silicon material into a predetermined shape, for example.

The driving device is provided with an electromagnetically-driven type driving mechanism. Incidentally, instead of the electromagnetically-driven type driving mechanism, the driving device may use an electrostatically-driven type driving mechanism or a piezoelectrically-driven driving mechanism.

Moreover, the probe memory apparatus 1 is provided with a post-circuit unit 40. The post-circuit unit 40 is mounted on the housing 12, for example.

Next, a specific explanation will be given on the structures of the probe head 15 and the post-circuit unit 40.

The left side of FIG. 2 shows one portion of the probe head 15. This drawing shows the probe head 15 in FIG. 1 viewed from the lower side. On the other hand, the right side of FIG. 2 shows the inner structure of the post-circuit unit 40. Moreover, FIG. 3 shows the four probes 17A to 17D and the primary circuit unit 30, which constitute one probe group 20 in FIG. 2.

As shown on the left side of FIG. 2, the 400 probes 17A to 17D arranged on the probe support substrate 16 of the probe head 15 are grouped into probe groups 20, each including the four probes 17A to 17D adjacent to each other. That is, 100 probe groups 20 are arranged on the probe support substrate 16. Of the probe groups, four probe groups 20 arranged in one portion of the probe support substrate 16 are drawn on the left side of FIG. 2.

Each probe group 20 is provided with the primary circuit unit 30. In each probe group 20, the primary circuit unit 30 is disposed in such a position that the primary circuit unit 30 is surrounded by the four probes 17A to 17D which belong to the probe group 20.

The primary circuit unit 30 of each probe group 20 is electrically connected to a bus line 22 through a connection line 21. The connection line 21 and the bus line 22 are wiring patterns formed on the probe support substrate 16, for example. The bus line 22 extends on the probe support substrate 16, and one end of the bus line 22 is electrically connected to the post-circuit unit 40.

As shown in FIG. 3, the primary circuit unit 30 is provided with: a modulation circuit 31; a selector switch 32; pre-amplifiers 33A to 33D, a selector switch 34; and a demodulation circuit 35. Moreover, as shown on the right side of FIG. 2, the post-circuit unit 40 is provided with: a recording circuit 41; a serial-parallel conversion circuit 42; a parallel-serial conversion circuit 43; a reproduction circuit 44; a buffer memory 45; and a CPU (Central Processing Unit) 46.

In performing a process of recording the information onto the recording surface 13D of the recording medium 13 (information recording process), firstly, the recording circuit 41 in FIG. 2 supplies record data, which is the information to be recorded onto the recording surface 13D of the recording medium 13, to the serial-parallel conversion circuit 42. The record data is supplied from the recording circuit 41 to the serial-parallel conversion circuit 42 at a speed of about 1 Gbps (1 gigabits per second), for example.

The serial-parallel conversion circuit 42 divides the record data into 100 record data groups, and distributes the respective 100 record data groups to the 100 probe groups 20, one by one. The buffer memory 45 is used for such a process of the serial-parallel conversion circuit 42.

Each record data group is supplied to the primary circuit unit 30 of each probe group 20 through the bus line 22 and the connection line 21 from the serial-parallel conversion circuit 42. The record data block is supplied simultaneously in parallel from the serial-parallel conversion circuit 42 to the primary circuit unit 30. Moreover, each record data group is supplied from the serial-parallel conversion circuit 42 to the primary circuit unit 30 at a speed of about 10 Mbps, for example.

As shown in FIG. 3, in each probe group 20, the record data group supplied to the primary circuit unit 30 is supplied to the modulation circuit 31. The modulation circuit 31 converts the record data included in the record data group, to a recording signal having a waveform suitable for the recording on the recording surface 13D of the recording medium 13. The recording signal is outputted from the modulation circuit 31 to the selector switch 32.

The selector switch 32 connects one probe of the four probes 17A to 17D included in each probe group 20 with the modulation circuit 31 provided for the probe group 20, and changes the probe to be connected to the modulation circuit 31 whenever the travel direction in the reciprocation in the X direction of the recording medium 13 is changed. The selector switch 32 is electrically connected to the CPU 46 provided for the post-circuit unit 40 (refer to FIG. 2) through the connection bus 21 and the bus line 22, and such an operation of the selector switch 32 is performed in accordance with a command from the CPU 46.

The recording signal outputted from the modulation circuit 31 is supplied to any one of the probes 17A to 17D, in response to the operation of the selector switch 32. Then, the recording signal is applied to the recording surface 13D of the recording medium 13 through the probe. By this, the information is recorded onto the recording surface 13D of the recording medium 13.

On the other hand, in performing a process of reproducing the information recorded on the recording surface 13D of the recording medium 13 (information reproducing process), in each probe group 20, the selector switch 34 connects one probe of the four probes 17A to 17D included in the probe group 20 with the demodulation circuit 35 provided for the probe group 20, and changes the probe to be connected to the demodulation circuit 35 whenever the travel direction in the reciprocation in the X direction of the recording medium 13 is changed. The selector switch 34 is electrically connected to the CPU 46 provided for the post-circuit unit 40 through the connection bus 21 and the bus line 22, and such an operation of the selector switch 34 is performed in accordance with a command from the CPU 46.

The information recorded on the recording surface 13D of the recording medium 13 is read by any one of the probes 17A to 17D which belong to each probe group 20, in response to the operation of the selector switch 34. The signal read by the probe (a reading signal) is supplied to the demodulation circuit 35 through the selector switch 34.

The demodulation circuit 35 converts the reading signal supplied through the selector switch 34, to a reading data group. That is, the reading signal immediately after being read by the probe has an analog waveform according to an information reading method (e.g. SNDM method). The demodulation circuit 35 converts the reading signal to a reading data block, which is a digital binary signal. Then, the demodulation circuit 35 outputs the reading data block to the connection line 21.

As shown in FIG. 2, the information reading by the probe and the signal conversion process by the demodulation circuit 35 are performed simultaneously in parallel in each probe group 20. Then, the reading data block is outputted simultaneously in parallel from the demodulation circuit 35 in each probe group 20, and is supplied to the parallel-serial conversion circuit 43 of the post-circuit unit 40. The reading data block is supplied from demodulation circuit 35 to the parallel-serial conversion circuit 43 at a speed of about 10 Mbps, for example.

The parallel-serial conversion circuit 43 converts the reading data block supplied from each demodulation circuit 35 in parallel, to reading data which is one serial data. The buffer memory 45 is used for such a process of the parallel-serial conversion circuit 43. The reading data is supplied from the parallel-serial conversion circuit 43 to the reproduction circuit 44 at a speed of about 1 Gbps, for example.

The reproduction circuit 44 performs a decoding process on the reading data. By this, the information recorded on the recording surface 13D of the recording medium 13 is reproduced.

In the information recording process and the information reproducing process as described above, the CPU 46 provided for the post-circuit unit 40 controls the changeover of the selector switches 32 and 34, as described above. At the same time, the CPU 46 also controls the driving of the actuator 18.

Specifically, the CPU 46 controls the actuator 18 in each of the information recording process and the information reproducing process, to thereby reciprocate the recording medium 13 in the X direction. The stroke amount of the actuator 18 at this time is about 100 μm. The recording medium 13 is reciprocated by a distance of about 100 μm in the X direction.

Then, in the information recording process, the CPU 46 controls the actuator 18 and the selector switch 32 such that a cycle in which the recording medium 13 changes the travel direction in the reciprocation is synchronized with a cycle in which the selector switch 32 in each probe group 20 changes the probe to be connected to the modulation circuit 31.

Moreover, in the information reproducing process, the CPU 46 controls the actuator 18 and the selector switch 34 such that the cycle in which the recording medium 13 changes the travel direction in the reciprocation is synchronized with a cycle in which the selector switch 34 in each probe group 20 changes the probe to be connected to the demodulation circuit 35.

Hereinafter, each of such a process that the cycle in which the recording medium 13 changes the travel direction in the reciprocation is synchronized with the cycle in which the selector switch 32 in each probe group 20 changes the probe to be connected to the modulation circuit 31, and such a process that the cycle in which the recording medium 13 changes the travel direction in the reciprocation is synchronized with the cycle in which the selector switch 34 in each probe group 20 changes the probe to be connected to the demodulation circuit 35, is referred to as a "probe switching process".

Next, an explanation will be given on the operations of the selector switch 32 and the actuator 18 in the probe switching process in the information recording process.

In the probe switching process in the information recording process, the selector switch 32 in each probe group and the actuator 18 operate as follows in accordance with the control of the CPU 46, for example.

As shown in FIG. 4, firstly, the actuator 18 displaces the recording medium 13 such that the tip of each of the probes 17A to 17D is brought close to or in contact with the recording 13D at a recording start position on the recording surface 13D of the recording medium 13 (step S1).

Incidentally, the probe memory apparatus 1 is provided with another actuator which displaces the recording medium 13 in a parallel direction to the recording surface 13D and which changes a positional relationship in the vertical direction between the recording medium 13 and the probes 17A to 17D. In the step S1, the probe memory apparatus 1 also drives this actuator.

Then, the selector switch 32 connects the probe 17A with the modulation circuit 31, and starts the reception of the recording signal supplied from the modulation circuit 31. Then, the actuator 18 displaces the recording medium 13 in a −X direction (e.g. to the left) by 100 µm (steps S2 and S3). By this, the recording signal supplied from the modulation circuit 31 is recorded onto the recording surface 13D of the recording medium 13 through the probe 17A.

After the recording medium 13 is displaced in the −X direction by 100 µm, the selector switch 32 stops the reception of the recording signal. Then, the selector switch 32 disconnects the probe 17A from the modulation circuit 31, and connects the probe 17B with the modulation circuit 31. Then, the selector switch 32 restarts the reception of the recording signal. Then, the actuator 18 displaces the recording medium 13 in a +X direction (e.g. to the right) by 100 µm (steps S4 to S7). By this, the recording signal is recorded onto the recording surface 13D of the recording medium 13 through the probe 17B.

After the recording medium 13 is displaced in the +X direction by 100 µm, the selector switch 32 stops the reception of the recording signal. Then, the selector switch 32 disconnects the probe 17B from the modulation circuit 31, and connects the probe 17C with the modulation circuit 31. Then, the selector switch 32 restarts the reception of the recording signal. Then, the actuator 18 displaces the recording medium 13 in the −X direction by 100 µm (steps S8 to S11). By this, the recording signal is recorded onto the recording surface 13D of the recording medium 13 through the probe 17C.

After the recording medium 13 is displaced in the −X direction by 100 µm, the selector switch 32 stops the reception of the recording signal. Then, the selector switch 32 disconnects the probe 17C from the modulation circuit 31, and connects the probe 17D with the modulation circuit 31. Then, the selector switch 32 restarts the reception of the recording signal. Then, the actuator 18 displaces the recording medium 13 in the +X direction by 100 µm (steps S12 to S15). By this, the recording signal is recorded onto the recording surface 13D of the recording medium 13 through the probe 17D.

After the recording medium 13 is displaced in the +X direction by 100 µm, the selector switch 32 stops the reception of the recording signal. Then, the selector switch 32 displaces (track-shifts) the recording medium 13 in a +Y direction by 1 µm (steps S16 and S17).

Then, the probe memory apparatus 1 repeats the process in the step S2 to step S17 until the information recording process is ended.

FIG. 5 shows the scanning transition of the probes 17A to 17D in each probe group 20 when the probe switching process is performed in the information recording process, in six scenes.

In FIG. 5, points T1, T2, T3, and T4 show the tips of the probes 17A to 17D, respectively. Arrows A1, A2, A3, and A4 indicate that the recording signal is being recorded onto the recording surface 13D. Moreover, the directions of the arrows A1, A2, A3, and A4 indicate the travel directions of the tips of the probes 17A to 17D with respect to the recording surface 13, respectively. Line segments L1, L2, L3, and L4 indicate that the recording of the recording signal onto the recording surface 13D is ended.

Incidentally, FIG. 5 shows the probe memory apparatus 1 in FIG. 1, viewed from the top to the bottom. Thus, the placement in the vertical direction of the probes 17A to 17D in FIG. 5 is opposite to that in FIG. 2 or FIG. 3, which requires an attention. Moreover, in FIG. 5, the probes 17A to 17D themselves seem to be displaced on the recording medium 13; however, it is the recording medium 13 that is actually displaced.

A scene 1 in FIG. 5 corresponds to the step S1 in FIG. 4. In the scene 1, each of the tips T1 to T4 of the probes 17A to 17D is at the recording start position (left edge position of a track).

A scene 2 corresponds to the steps S2 and S3 in FIG. 4. In the scene 2, each of the tip positions T1 to T4 of the probes 17A to 17D is displaced to the right edge position of the track. During the displacement, the recording signal is recorded by the probe 17A. However, the recording signal is not recorded by the probes 17B to 17D.

A scene 3 corresponds to the steps S4 to S7 in FIG. 4. In the scene 3, each of the tip positions T1 to T4 of the probes 17A to 17D is displaced to the left edge position of the track. During the displacement, the recording signal is recorded by the probe 17B. However, the recording signal is not recorded by the probes 17A, 17C, and 17D.

A scene 4 corresponds to the steps S8 to S11 in FIG. 4. In the scene 4, each of the tip positions T1 to T4 of the probes 17A to 17D is displaced to the right edge position of the track. During the displacement, the recording signal is recorded by the probe 17C. However, the recording signal is not recorded by the probes 17A, 17B, and 17D.

A scene 5 corresponds to the steps S12 to S15 in FIG. 4. In the scene 5, each of the tip positions T1 to T4 of the probes 17A to 17D is displaced to the left edge position of the track. During the displacement, the recording signal is recorded by the probe 17D. However, the recording signal is not recorded by the probes 17A to 17C.

A scene 6 corresponds to the steps S16 and S17 in FIG. 4. In the scene 6, each of the tip positions T1 to T4 of the probes 17A to 17D is displaced (track-shifted) to the lower side (left edge position of a next track.

As can be seen from FIG. 5, the recording medium 13 reciprocates twice in the X direction. During this time, the recording medium 13 is not track-shifted (not displaced to change the track) in the Y direction. Moreover, while the recording medium 13 reciprocates twice in the X direction, the probe to record the recording signal is sequentially changed whenever the travel direction of the recording medium 13 is changed.

Next, an explanation will be given on the operations of the selector switch 34 and the actuator 18 in the probe switching process in the information reproducing process.

In the probe switching process in the information reproducing process, the selector switch 34 and the actuator 18 operate as follows in accordance with the control of the CPU 46, for example.

As shown in FIG. 6, firstly, the actuator 18 displaces the recording medium 13 such that the tip of each of the probes 17A to 17D is brought close to or in contact with the recording 13D at a reading start position on the recording surface 13D of the recording medium 13 (step S21).

Then, the selector switch 34 connects the probe 17A with the demodulation circuit 35. Then, the actuator 18 displaces the recording medium 13 in the −X direction by 100 μm (steps S22 and S23). By this, the information is read from the recording surface 13D of the recording medium 13 by the probe 17A, and the reading signal is supplied to the demodulation circuit 35.

After the recording medium 13 is displaced in the −X direction by 100 μm, the selector switch disconnects the probe 17A from the demodulation circuit 35, and connects the probe 17B with the demodulation circuit 35. Then, the actuator 18 displaces the recording medium 13 in the +X direction by 100 μm (steps S24 and S25). By this, the information is read from the recording surface 13D of the recording medium 13 by the probe 17B, and the reading signal is supplied to the demodulation circuit 35.

After the recording medium 13 is displaced in the +X direction by 100 μm, the selector switch 34 disconnects the probe 17B from the demodulation circuit 35, and connects the probe 17C with the demodulation circuit 35. Then, the selector switch 32 restarts the reception of the recording signal. Then, the actuator 18 displaces the recording medium 13 in the −X direction by 100 μm (steps S26 and S27). By this, the information is read from the recording surface 13D of the recording medium 13 by the probe 17C, and the reading signal is supplied to the demodulation circuit 35.

After the recording medium 13 is displaced in the -X direction by 100 μm, the selector switch 34 disconnects the probe 17C from the demodulation circuit 35, and connects the probe 17D with the demodulation circuit 35. Then, the actuator 18 displaces the recording medium 13 in the +X direction by 100 μm (steps S28 and S29). By this, the information is read from the recording surface 13D of the recording medium 13 by the probe 17D, and the reading signal is supplied to the demodulation circuit 35.

After the recording medium 13 is displaced in the +X direction by 100 μm, the actuator 18 displaces (track-shifts) the recording medium 13 in the +Y direction by 1 μm (steps S30).

Then, the probe memory apparatus 1 repeats the process in the step S22 to step S30 until the information reproducing process is ended.

The scanning transition of the probes 17A to 17D in each probe group 20 when the probe switching process is performed in the information reproducing process is the same as that in the information recording process (refer to FIG. 5).

As explained above, in the probe memory apparatus 1, in each probe group 20, the probe to be connected to the modulation circuit 31 or the demodulation circuit 35 is changed whenever the travel direction in the reciprocation in the X direction of the recording medium 13 is changed.

Therefore, as shown in FIG. 3, it is only necessary to provide each probe group 20 with one primary circuit unit 30 including the modulation circuit 31 and the demodulation circuit 35 or the like. That is, only one primary circuit unit 30 may be assigned to the four probes 17A to 17D. In other words, it is unnecessary to assign one primary circuit unit 30 to one probe. Thus, it is possible to reduce the number of the primary circuit units 30 to be disposed on the probe support substrate 16 of the probe head 15.

Thus, even if the number of the probes 17A to 17D is large and the interval of the adjacent probes is small, it is possible to ensure a space to dispose the primary circuit units 30 on the probe support substrate 16.

Therefore, it is possible to increase the number of the probes 17A to 17D, and to reduce the interval of the probes adjacent to each other in the X direction. Hence, it is possible to reduce the stroke amount of the actuator 18 for displacing the recording medium 13 in the X direction. Thus, it is possible to respond to the requirements, such as increasing the information recording speed and the information reading speed, limiting or controlling power consumption by the driving of the actuator 18, and reducing the size of the probe memory apparatus 1, in a balanced manner, and it is possible to increase the performance of the probe memory apparatus 1.

Moreover, on the probe memory apparatus 1, in each probe group 20, the probe to be connected to the demodulation circuit 35 is changed whenever the travel direction in the reciprocation in the X direction of the recording medium 13 is changed.

By this, in the information reproducing process, it is possible to reduce the number of read data, which is supplied simultaneously in parallel to the parallel-serial conversion circuit 43.

That is, if the information recorded on the recording surface 13D of the recording medium 13 is simultaneously read using all the probes 17A to 17D disposed on the probe head 15, 400 read data is supplied simultaneously in parallel from the 400 probes 17A to 17D to the parallel-serial conversion circuit 43. As a result, in order to perform a conversion process on the parallel-serial conversion circuit 43, it is unnecessary to increase he memory capacity of the buffer memory 45.

According to the probe memory apparatus 1, however, in each probe group 20, since the probe to be connected to the demodulation circuit 35 is changed whenever the travel direction in the reciprocation in the X direction of the recording medium 13 is changed, there will be 100 read data (read data group), which is supplied simultaneously in parallel to the parallel-serial conversion circuit 43. That is, as compared to the total number (400) of the probes 17A to 17D disposed on the probe head 15, the total number (100) of the read data (read data group) supplied to the parallel-serial conversion circuit 43 can be small. Therefore, it is possible to reduce the memory capacity of the buffer memory 45 used to perform the conversion process on the parallel-serial conversion circuit 43.

Second Embodiment

FIG. 7 shows a post-circuit unit and a probe head of a scanning probe memory apparatus in a second embodiment of the information recording/reproducing apparatus of the present invention. Incidentally, in FIG. 7, the same constituent elements as those shown in FIG. 2 carry the same numerical references.

In the information recording process, a CPU 51 provided for the post-circuit unit 50 in FIG. 7 controls the selector switch 32 in each probe group 20 to change the probe to be connected to the modulation circuit 31 whenever the recording medium 13 reciprocates once in the X direction. That is, the CPU 51 synchronizes a cycle in which the recording medium 13 reciprocates once with a cycle in which the selector switch 32 in each probe group 20 changes the probe to be connected to the modulation circuit 31.

On the other hand, in the information reproducing process, the CPU 51 controls the selector switch 34 in each probe group 20 to change the probe to be connected to the demodulation circuit 35 whenever the recording medium 13 reciprocates once in the X direction. That is, the CPU 51 synchronizes the cycle in which the recording medium 13 reciprocates once with a cycle in which the selector switch 34 in each probe group 20 changes the probe to be connected to the demodulation circuit 35.

In the second embodiment, for example, the information recorded on the recording surface 13D is deleted using the probe 17A while the recording medium 13 is displaced by 100 μm in the −X direction, and then the information is recorded using the probe 17A while the recording medium 13 is displaced by 100 μm in the +X direction. Then, while the probe is changed whenever the recording medium 13 reciprocates once, such information deletion and information recording are repeated. In this case, the recording medium 13 repeats such a motion that it reciprocates four times in the X direction and then track-shifts once in the Y direction.

Even in the second embodiment, it is possible to achieve substantially the same effect as that in the first embodiment.

Third Embodiment

FIG. 8 shows a post-circuit unit and a probe head of a scanning probe memory apparatus in a third embodiment of the information recording/reproducing apparatus of the present invention. Incidentally, in FIG. 8, the same constituent elements as those shown in FIG. 2 carry the same numerical references.

In the information recording process, a CPU 61 provided for the post-circuit unit 60 in FIG. 8 controls the selector switch 32 in each probe group 20 to change the probe to be connected to the modulation circuit 31 whenever the recording medium 13 reciprocates 1.5 times in the X direction. That is, the CPU 61 synchronizes a cycle in which the recording medium 13 reciprocates 1.5 times with a cycle in which the selector switch 32 in each probe group 20 changes the probe to be connected to the modulation circuit 31.

On the other hand, in the information reproducing process, the CPU 61 controls the selector switch 34 in each probe group 20 to change the probe to be connected to the demodulation circuit 35 whenever the recording medium 13 reciprocates 1.5 times in the X direction. That is, the CPU 61 synchronizes the cycle in which the recording medium 13 reciprocates 1.5 times with a cycle in which the selector switch 34 in each probe group 20 changes the probe to be connected to the demodulation circuit 35.

In the third embodiment, the recording medium 13 repeats such a motion that it reciprocates six times in the X direction and then track-shifts once in the Y direction.

Even in the third embodiment, it is possible to achieve substantially the same effect as that in the first embodiment.

Fourth Embodiment

FIG. 9 shows a post-circuit unit and a probe head of a scanning probe memory apparatus in a fourth embodiment of the information recording/reproducing apparatus of the present invention. Incidentally, in FIG. 9, the same constituent elements as those shown in FIG. 2 carry the same numerical references.

In the information recording process, a CPU 71 provided for the post-circuit unit 70 in FIG. 9 controls the selector switch 32 in each probe group 20 to change the probe to be connected to the modulation circuit 31 whenever the recording medium 13 reciprocates n times (n is an integer of 2 or more) in the X direction. That is, the CPU 71 synchronizes a cycle in which the recording medium 13 reciprocates n times with a cycle in which the selector switch 32 in each probe group 20 changes the probe to be connected to the modulation circuit 31.

On the other hand, in the information reproducing process, the CPU 71 controls the selector switch 34 in each probe group 20 to change the probe to be connected to the demodulation circuit 35 whenever the recording medium 13 reciprocates n times in the X direction. That is, the CPU 71 synchronizes the cycle in which the recording medium 13 reciprocates 1.5 times with a cycle in which the selector switch 34 in each probe group 20 changes the probe to be connected to the demodulation circuit 35.

Even in the fourth embodiment, it is possible to achieve substantially the same effect as that in the first embodiment.

Fifth Embodiment

FIG. 10 shows a post-circuit unit and a probe head of a scanning probe memory apparatus in a fifth embodiment of the information recording/reproducing apparatus of the present invention. Incidentally, in FIG. 10, the same constituent elements as those shown in FIG. 2 carry the same numerical references.

In the information recording process, a CPU 81 in FIG. 10 controls the selector switch 32, to thereby connect the probe 17A in each probe group 20 with the modulation circuit 31 when the recording medium 13 is displaced in a predetermined section during an outward journey, and connect the probe 17B in each probe group 20 with the modulation circuit 31 when the recording medium 13 is displaced in the predetermined section during a homeward journey.

On the other hand, in the information reproducing process, the CPU 81 controls the selector switch 34, to thereby connect the probe 17A in each probe group 20 with the demodulation circuit 35 when the recording medium 13 is displaced in the predetermined section during the outward journey, and connect the probe 17B in each probe group 20 with the demodulation circuit 35 when the recording medium 13 is displaced in the predetermined section during the homeward journey.

For example, in the information recording process, under the control of the CPU 81, the selector switch 32 and the actuator 18 operate as shown in FIG. 11.

Firstly, each of the tips T1 to T4 of the respective probes 17A to 17D is at the recording start position (left edge position of each track). Then, the selector switch 32 connects the probe 17A with the modulation circuit 31 (Scene 1).

Then, the actuator 18 displaces the recording medium 13 in the −X direction by 50 μm. By this, each of the tip positions T1 to T4 of the probes 17A to 17D is displaced to the intermediate position of each track. During the displacement, the recording signal is recorded by the probe 17A (Scene 2).

Then, the selector switch 32 disconnects the probe 17A from the modulation circuit 31 and connects the probe 17B with the modulation circuit 31. Then, the actuator 18 further displaces the recording medium 13 in the −X direction by 50 μm. By this, each of the tip positions T1 to T4 of the probes 17A to 17D is displaced to the right edge position of each track. During the displacement, the recording signal is recorded by the probe 17B (Scene 3).

Then, the selector switch 32 disconnects the probe 17B from the modulation circuit 31 and connects the probe 17A with the modulation circuit 31. Then, the actuator 18 further displaces the recording medium 13 in the +X direction by 50 μm. By this, each of the tip positions T1 to T4 of the probes 17A to 17D is displaced to the intermediate position of each track. During the displacement, the recording signal is recorded by the probe 17A (Scene 4).

Then, the selector switch 32 disconnects the probe 17A from the modulation circuit 31 and connects the probe 17B with the modulation circuit 31. Then, the actuator 18 further displaces the recording medium 13 in the +X direction by 50 μm. By this, each of the tip positions T1 to T4 of the probes 17A to 17D is displaced to the left position of each track. During the displacement, the recording signal is recorded by the probe 17B (Scene 5).

As described above, in the information recording process, when the probes 17A and the probe 17B are displaced in the predetermined section from the left edge position to the intermediate position of the tracks due to the displacement in the −X direction of the recording medium 13, the selector switch 32 connects the probe 17A with the modulation circuit 31. On the other hand, when the probes 17A and the probe 17B are displaced in the predetermined section from the intermediate position to the left edge position of the tracks due to the displacement in the +X direction of the recording medium 13, the selector switch 32 connects the probe 17B with the modulation circuit 31.

In the same manner, when the probes 17A and the probe 17B are displaced in the predetermined section from the intermediate position to the right edge position of the tracks due to the displacement in the −X direction of the recording medium 13, the selector switch 32 connects the probe 17B with the modulation circuit 31. On the other hand, when the probes 17A and the probe 17B are displaced in the predetermined section from the right edge position to the intermediate position of the tracks due to the displacement in the +X direction of the recording medium 13, the selector switch 32 connects the probe 17B with the modulation circuit 31.

Even in the fifth embodiment, it is possible to achieve substantially the same effect as that in the first embodiment.

Incidentally, in the explanation of each embodiment described above, such a case is taken as an example that the linear tracks are formed in the X direction on the recording surface 13D; however, the present invention is not limited to this. The shape of the track may be arced or meandering.

Moreover, in the explanation of each embodiment described above, such a case is taken as an example that the four probes 17A to 17D are grouped to form one probe group 20; however, the present invention is not limited to this. Two, three, or five or more probes may be grouped to form one probe group.

Moreover, in the explanation of each embodiment described above, such a case is taken as an example that the four probes 17A to 17D which are adjacent to each other and which are arranged in a matrix are grouped to form one probe group 20; however, the present invention is not limited to this. The four probes 17A to 17D which are arranged on a line may be grouped to form one probe group.

Moreover, the probes used to form one probe group are not necessarily adjacent to each other. For example, a probe which does not belong to the same probe group can be disposed between two probes which belong to the same probe group.

Moreover, in the explanation of each embodiment described above, such a case is taken as an example that the plurality of probe groups 20 are arranged on the probe head 15; however, the present invention can be also applied to the case where the probe head is provided with one probe group. In this case, in the probe group, the probe to be connected to the demodulation circuit is changed whenever the travel direction in the reciprocation of the recording medium is changed, so that the read data outputted from the demodulation circuit is serial data. Moreover, because there is only one probe group, it is only necessary to supply the post-circuit unit with the read data outputted from the demodulation circuit in this probe group. Therefore, it is possible to eliminate the parallel-serial conversion circuit and the buffer memory necessary for the parallel-serial conversion.

In the explanation of each embodiment described above, such a case is taken as an example that the cycle in which the recording medium 13 changes the travel direction in the reciprocation is synchronized with the cycle in which the selector switch 32 or 34 in each probe group 20 changes the probe. However, if the probe change by the selector switch is performed during the displacement control of the recording medium, the cycle in which the recording medium changes the travel direction is not necessarily synchronized with the cycle in which the selector switch changes the probe. For example, the cycle in which the recording medium changes the travel direction is not necessarily synchronized with the cycle in which the selector switch changes the probe, if the scanning is performed on one track more than twice, such as a case where the information already recorded in a certain track of the recording medium is deleted and then another information is recorded into the track and a case where the information is recorded onto the information recording medium and then the content of the recorded information is confirmed.

Moreover, in the explanation of each embodiment described above, such a case is taken as an example that the primary circuit unit 30 including the selector switches 32 and 34 is disposed in such a position that the primary circuit unit 30 is surrounded by the four probes 17A to 17D; however, the present invention is not limited to this. The primary circuit unit 30 may be disposed between the two probes adjacent to each other.

Moreover, in the explanation of each embodiment described above, such a case is taken as an example that the primary circuit unit 30 including the selector switches 32 and 34 is disposed in such a position that the primary circuit unit 30 is surrounded by the four probes 17A to 17D; however, the present invention is not limited to this. The primary circuit unit 30 may be disposed between the two probes adjacent to each other.

Moreover, in the explanation of each embodiment described above, such a case is taken as an example that the information recording principle is used in which the recording medium 13 having the recording layer 13C formed of the ferroelectric material is used and the polarization direction of the ferroelectric substance is changed to thereby record the information and that the SNDM method is used as the information reproduction principle. However, the information recording principle and the information reproduction principle that can be adopted in the information recording/reproducing apparatus of the present invention is not limited to this. It is possible to adopt various information recording principles and information reproduction principles, such as using a tunnel effect, using an atomic force, using a magnetic force, using an electrostatic force, using a non-linear dielectric constant, and using heat deformation of a recording medium.

Moreover, the CPU 46 in FIG. 2 and the selector switches 32 and 34 in FIG. 3 are a specific example of the changing device. Moreover, the CPU 51 in FIG. 7 and the selector switches 32 and 34 in FIG. 3 are another specific example of the changing device. Moreover, the CPU 61 in FIG. 8 and the selector switches 32 and 34 in FIG. 3 are another specific example of the changing device. Moreover, the CPU 71 in FIG. 9 and the selector switches 32 and 34 in FIG. 3 are another specific example of the changing device. Moreover, the CPU 81 in FIG. 10 and the selector switches 32 and 34 in FIG. 3 are another specific example of the changing device. Moreover, the modulation circuit 31 and the demodulation circuit 35 in FIG. 3 are a specific example of the signal processing circuit.

Moreover, in the present invention, various changes may be made, if desired, without departing from the essence or spirit of the invention which can be read from the claims and the entire specification. An information recording/reproducing apparatus, which involves such changes, is also intended to be within the technical scope of the present invention.

INDUSTRIAL APPLICABILITY

The information recording/reproducing apparatus according to the present invention can be applied to an information recording/reproducing apparatus for recording or reproducing information with respect to an information recording medium, using a plurality of probes, such as a scanning probe memory apparatus, for example.

The invention claimed is:

1. An information recording/reproducing apparatus comprising:
   a recording medium having a recording surface;
   a probe head in which one or a plurality of probe groups are arranged, each probe group including a plurality of probes which are close to each other and which record or read information with respect to the recording surface of the recording medium;
   an actuator configured to perform displacement control of the recording medium or the probe head in order to reciprocate the recording medium or the probe head in a direction parallel to the recording surface;
   a signal processing circuit which is provided for each probe group and which is configured to supply each probe with a recording signal corresponding to information to be recorded onto the recording surface of the recording medium, or which receives a reading signal corresponding to information read from each probe; and
   a changing device which is configured to connect a probe included in a corresponding probe group with the signal processing circuit corresponding to the probe group and which is configured to subsequently change the probe connected to the signal processing circuit to another probe included in the same probe group during the displacement control for reciprocating the recording medium or the probe head,
   wherein the changing device is configured to change the probe connected to the signal processing circuit whenever a travel direction of the reciprocating of the recording medium or the probe head is changed.

2. The information recording/reproducing apparatus according to claim 1, wherein the changing device is disposed between two probes which are included in the probe group of the probe head and which are adjacent to each other.

3. The information recording/reproducing apparatus according to claim 1, wherein the changing device is disposed in such a position that the changing device is surrounded by the plurality of probes included in the probe group of the probe head.

4. An information recording/reproducing apparatus comprising:
   a recording medium having a recording surface;
   a probe head in which one or a plurality of probe groups are arranged, each probe group including a plurality of probes which are close to each other and which record or read information with respect to the recording surface of the recording medium;
   an actuator configured to perform displacement control of the recording medium or the probe head in order to reciprocate the recording medium or the probe head in a direction parallel to the recording surface;
   a signal processing circuit which is provided for each probe group and which is configured to supply each probe with a recording signal corresponding to information to be recorded onto the recording surface of the recording medium, or which receives a reading signal corresponding to information read from each probe; and
   a changing device which is configured to connect a probe included in a corresponding probe group with the signal processing circuit corresponding to the probe group and which is configured to subsequently change the probe connected to the signal processing circuit to another probe included in the same probe group during the displacement control for reciprocating the recording medium or the probe head,
   wherein the changing device is configured to connect a first probe included in each probe group with the signal processing circuit corresponding to the probe group when the recording medium or the probe head is displaced in a predetermined section in an outward journey, and the changing device is configured to connect a second probe included in each probe group with the signal processing circuit corresponding to the probe group when the recording medium or the probe head is displaced in the predetermined section in a homeward journey.

5. An information recording/reproducing apparatus for recording information to/reproducing information from a recording medium including a recording surface, the information recording/reproducing apparatus comprising:
   a probe head comprising one or more probe groups, each probe group including a plurality of probes for recording information to and reading information from the recording medium;
   an actuator configured to reciprocatingly displace the recording medium relative to the probe head in a direction parallel to the recording surface;
   signal processing circuitry respectively provided for each probe group, the signal processing circuitry for each probe group being configured to supply each probe of the probe group with a recording signal corresponding to information to be recorded onto the recording medium, and to receive from each probe of the probe group a reading signal corresponding to information read from the recording medium; and
   a switch device respectively provided for each probe group, the switch device for each probe group being configured to switch which probe in the probe group is connected to the signal processing circuitry for the probe group during the reciprocating displacement of the recording medium relative to the probe head,
   wherein the switch device switches the probe connected to the signal processing circuit whenever a direction of the reciprocating displacement of the recording medium relative to the probe head is changed.

6. An information recording/reproducing apparatus for recording information to/reproducing information from a recording medium including a recording surface, the information recording/reproducing apparatus comprising:

a probe head comprising one or more probe groups, each probe group including a plurality of probes for recording information to and reading information from the recording medium;

an actuator configured to reciprocatingly displace the recording medium relative to the probe head in a direction parallel to the recording surface;

signal processing circuitry respectively provided for each probe group, the signal processing circuitry for each probe group being configured to supply each probe of the probe group with a recording signal corresponding to information to be recorded onto the recording medium, and to receive from each probe of the probe group a reading signal corresponding to information read from the recording medium; and a switch device respectively provided for each probe group, the switch device for each probe group being configured to switch which probe in the probe group is connected to the signal processing circuitry for the probe group during the reciprocating displacement of the recording medium relative to the probe head, wherein each switch device is disposed to be surrounded by the probes in the corresponding probe group of the probe head.

* * * * *